(12) United States Patent
Ziolko et al.

(10) Patent No.: US 9,552,811 B2
(45) Date of Patent: Jan. 24, 2017

(54) SPEECH RECOGNITION SYSTEM AND A METHOD OF USING DYNAMIC BAYESIAN NETWORK MODELS

(71) Applicant: AKADEMIA GORNICZO-HUTNICZA IM. STANISLAWA STAZICA W KRAKOWIE, Crakow (PL)

(72) Inventors: Bartosz Ziolko, Crakow (PL); Tomasz Jadczyk, Tarnowskie Gory (PL)

(73) Assignee: AKADEMIA GORNICZO-HUTNICZA IM. STANISLAWA STASZICA W KRAKOWIE, Crakow (PL)

( * ) Notice: Subject to any disclaimer, the term of this patent is extended or adjusted under 35 U.S.C. 154(b) by 13 days.

(21) Appl. No.: 14/408,964

(22) PCT Filed: Jun. 26, 2013

(86) PCT No.: PCT/EP2013/063330
§ 371 (c)(1),
(2) Date: Dec. 18, 2014

(87) PCT Pub. No.: WO2014/177232
PCT Pub. Date: Nov. 6, 2014

(65) Prior Publication Data
US 2016/0111086 A1    Apr. 21, 2016

(30) Foreign Application Priority Data
May 1, 2013   (PL) .......................................... 403724

(51) Int. Cl.
*G10L 15/16*   (2006.01)
*G10L 15/14*   (2006.01)
(Continued)

(52) U.S. Cl.
CPC .............. *G10L 15/16* (2013.01); *G10L 15/04* (2013.01); *G10L 15/14* (2013.01); *G10L 15/24* (2013.01); *G06N 7/005* (2013.01)

(58) Field of Classification Search
CPC ...................................................... G10L 15/16
See application file for complete search history.

(56) References Cited

U.S. PATENT DOCUMENTS

| 6,292,776 B1 | 9/2001 | Chengalvarayan |
| 2004/0056907 A1* | 3/2004 | Sharma .................. G10L 15/24 715/863 |

(Continued)

OTHER PUBLICATIONS

Xavier Domont et al: "Hierarchical spectro-temporal features for robust speech recognition", Acoustics, Speech and Signal Processing, 2008. ICASSP 2008. IEEE International Conference on, IEEE, Piscataway, NJ, USA, Mar. 31, 2008 (Mar. 31, 2008), pp. 4417-4420, XP031251577, ISBN: 978-1-4244-1483-3 sections 1, 3.2 and 4.2.

(Continued)

*Primary Examiner* — Douglas Godbold
(74) *Attorney, Agent, or Firm* — Mark M. Friedman (57) ABSTRACT

A computer-implemented method for speech recognition, comprising the steps of: registering (201) by means of an input device (102A), electrical signal representing speech and converting the signal to frequency or time-frequency domain (202), analyzing the signal in an analysis module based on Dynamic Bayesian Network (205) configured to generate hypotheses of words (W) and their probabilities on the basis of observed signal features (OA, OV), recognizing (209) a text corresponding to the electrical signal representing speech on the basis of certain word (W) hypotheses and their probabilities. The method is characterized by inputting to the analysis module (205), observed signal features (308-312), which are determined for the signal in frequency or (Continued)

time-frequency domain (202) in at least two parallel signal processing lines (204a, 204b, 204c, 204d, 201a) for time segments distinct for each line, and analyzing in the analysis module (205) relations between observed signal features (308-312) for at least two distinct time segments in the analysis module (205).

8 Claims, 4 Drawing Sheets

(51) Int. Cl.
  *G10L 15/04* (2013.01)
  *G10L 15/24* (2013.01)
  *G06N 7/00* (2006.01)

(56) References Cited

U.S. PATENT DOCUMENTS

| | | | | |
|---|---|---|---|---|
| 2004/0260548 | A1* | 12/2004 | Attias | G06K 9/6226 704/236 |
| 2005/0228673 | A1* | 10/2005 | Nefian | G10L 15/25 704/270 |
| 2006/0230140 | A1* | 10/2006 | Aoyama | G06N 3/08 709/224 |
| 2010/0191722 | A1* | 7/2010 | Boiman | G06F 17/30787 707/723 |
| 2013/0132089 | A1* | 5/2013 | Fanty | G10L 21/00 704/270 |

OTHER PUBLICATIONS

Spephane Dupont et al: "Audio-Visual Speech Modeling for Continuous Speech Recognition", IEEE Transactions on Multimedia, IEEE Service Center, Piscataway, NJ, US, vol. 2, No. 3, Sep. 1, 2000 (Sep. 1, 2000), XP011036218, ISSN:1520-9210 section III.B.
Astrid Hagen et al: "Using Multiple Times Scales in the Framework of Multi-Stream Speech Recognition", International Conf. on Spoken Language Processing, Beijing 2000, Oct. 16, 2000 (Oct. 16, 2000), XP007011060, the whole document.
'Todd A Stephenson Nerve Bourlard Samy Bengio Andrew C Morris Dalle Molle Institute or Perceptual Artificial Intelligence (IDIAP): "Automatic Speech Recognition Using Dynamic Bayesian Networks With Both Acoustic and Articulatory Variables", 5TH. International Conference of Spoken Language Processing. ICSLP 2000. Beijing, China, Oct. 16-20, 2000; the whole document.
T.J. Hazen: "Visual model structures and synchrony constraints for audio-visual speech recognition", IEEE Transactions on Audio, Speech and Language Processing, vol. 14, No. 3, May 1, 2006 (May 1, 2006), pp. 1082-1089, xp055112509, the whole document.
\Gowdy J et al: "DBN based multi-stream models for audio-visual speech recognition", Acoustics, Speech, and Signal Processing, 2004. Proceedings. (ICASSP '04). IEEE International Conference on Montreal, Quebec, vol. 1, May 17, 2004 (May 17, 2004), pp. 993-996, XP010717798, sections 2 and 3.
Kate Saenko et al: "An Asynchronous DBN for Audio-Visual Speech Recognition", Spoken Language Technology Workshop, 2006. IEEE, IEEE, PI, Dec. 1, 2006 (Dec. 1, 2006), pp. 154-157, XP031056424, ISBN: 978-1-4244-0872-6, sections 2 to 4.

* cited by examiner

SPEECH RECOGNITION SYSTEM AND A METHOD OF USING DYNAMIC BAYESIAN NETWORK MODELS

TECHNICAL FIELD

The object of the present invention is a speech recognition system and a method of using Bayesian networks for this purpose. In particular, such an automatic speech recognition system that is applicable in dialog systems for advertising and for informational purposes. Implementations of dialog systems may take a form of information kiosks or booths that will begin a conversation with a customer or viewer and will present appropriate multimedia content.

BACKGROUND ART

Speech recognition systems are becoming more and more common in everyday life. For example they have been implemented in information call centers such as for public transport. These systems are, however, still frequently operated by keypads and text as a source of input information, instead of speech.

There are known various kinds of computerized interactive kiosks allowing for conducting a conversation with a user. For example, a U.S. Pat. No. 6,256,046 discloses an active public user interface in a computerized kiosk sensing persons by processing of visual data, by using movement and color analysis to detect changes in the environment indicating the presence of people. Interaction spaces are defined and the system records an initial model of its environment which is updated over time to reflect the addition or subtraction of inanimate objects and to compensate for lighting changes. The system develops models of the moving objects and is thereby able to track people as they move about the interaction spaces. A stereo camera system further enhances the system's ability to sense location and movement. The kiosk presents audio and visual feedback in response to what it "sees".

A US patent application US20080204450 discloses a system, method and program product for providing a virtual universe in which unsolicited advertisements are embodied in automated avatars. A system is provided that includes: a registration system for introducing an advertisement avatar into the virtual universe; a targeting system for targeting a user avatar for delivery of advertising content by the advertisement avatar; a movement system for defining how the advertisement avatar is to move within the virtual universe; and an advertisement delivery system for defining how the advertisement avatar is to deliver the advertising content to the user avatar.

The drawbacks of the known dialog systems, such as described above, include insufficient speech recognition capabilities for conducting a complex conversation with a user.

U.S. Pat. No. 7,203,368 discloses a pattern recognition procedure that forms a hierarchical statistical model using HMM (Hidden Markov Model) and CHMM (Coupled Hidden Markov Model). The hierarchical statistical model supports a parent layer having multiple supernodes and a child layer having multiple nodes associated with each supernode of the parent layer. After training, the hierarchical statistical model uses observation vectors extracted from a data set to find a substantially optimal state sequence segmentation. An improvement to this process would be advantageous.

A more general solution, posing fewer restrictions than solutions based on HMM uses Bayesian networks for speech recognition. Solutions using Bayesian networks, including Dynamic Bayesian Networks (DBN), have been presented in the following publications:

M. Wester, J. Frankel, and S. King, "Asynchronous articulatory feature recognition using dynamic Bayesian networks" (Proceedings of IEICI Beyond HMM Workshop, 2004), J. A. Bilmes and C. Bartels, "Graphical model architectures for speech recognition", IEEE Signal Processing Magazine, vol. 22, pp. 89-100, 2005, J. Frankel, M. Wester, and S. King, "Articulatory feature recognition using dynamic Bayesian networks", Computer Speech and Language, vol. 21, no. 4, pp. 620-640, October 2007.

Speech recognition methods which utilize Bayesian networks are based on modeling of sound duration according to features vector. In DBNs it has become possible to replace a variable representing duration with a variable representing a sound. Nevertheless, all prior art solutions conducted speech analysis in a predefined time range.

Taking into account the foregoing prior art there is a need to design and implement a speech recognition system and method that would allow improved dialog efficiency between a human and a machine.

DISCLOSURE OF THE INVENTION

The object of the invention is a computer-implemented method for automatic speech recognition, comprising the steps of registering, by means of an input device, electrical signal representing speech and converting the signal to frequency or time-frequency domain, analyzing the signal in an analysis module based on DBN, configured to generate hypotheses of words (W) and their probabilities on the basis of observed signal features (OA, OV), recognizing a text corresponding to the electrical signal representing speech, on the basis of certain word (W) hypotheses and their probabilities. The method is characterized by inputting, to the analysis module, observed signal features which are determined for the signal in frequency or time-frequency domain in at least two parallel signal processing lines for time segments, distinct for each line, and analyzing, in the analysis module, relations between the observed signal features for at least two distinct time segments.

Preferably, the time segments have a predefined duration.

Preferably, the time segments depend on the content of speech segments, such as phonemes, syllables, words.

Preferably, the method further comprises defining, in the analysis module, deterministic and probabilistic relations between variables describing the model, whereas the probabilistic relations are defined at least for linking the observed signal features with a current state (Sti).

Preferably, the method further comprises analyzing different observed signal features (OA, OV) in a simultaneous way.

Another object of the invention is a computer-implemented system for speech recognition, comprising an input device for registering an electrical signal representing speech, a module for converting the registered electrical signal representing speech to frequency or time-frequency domain, an analysis module based on a DBN, configured to analyze the signal representing speech and to generate hypotheses of words (W) and their probabilities on the basis of the observed signal features (OA, OV), a module for recognition of text corresponding to the electrical signal representing speech on the basis of the defined hypotheses of words (W) and their probabilities. The system further comprises at least two signal parameterization modules for determining for the analysis module at least two observed signal features in at least two parallel signal processing lines for time segments distinct for each line, wherein the analysis module is configured to analyze dependencies between the observed signal features for at least two distinct time segments.

The object of the invention is also a computer program comprising program code means for performing all the steps of the computer-implemented method according to the invention when said program is run on a computer, as well as a computer readable medium storing computer-executable instructions performing all the steps of the computer-implemented method according to the invention when executed on a computer.

BRIEF DESCRIPTION OF DRAWINGS

The object of the invention has been presented in an exemplary embodiment in a drawing, in which.

MODES FOR CARRYING OUT THE INVENTION

Figure 1:
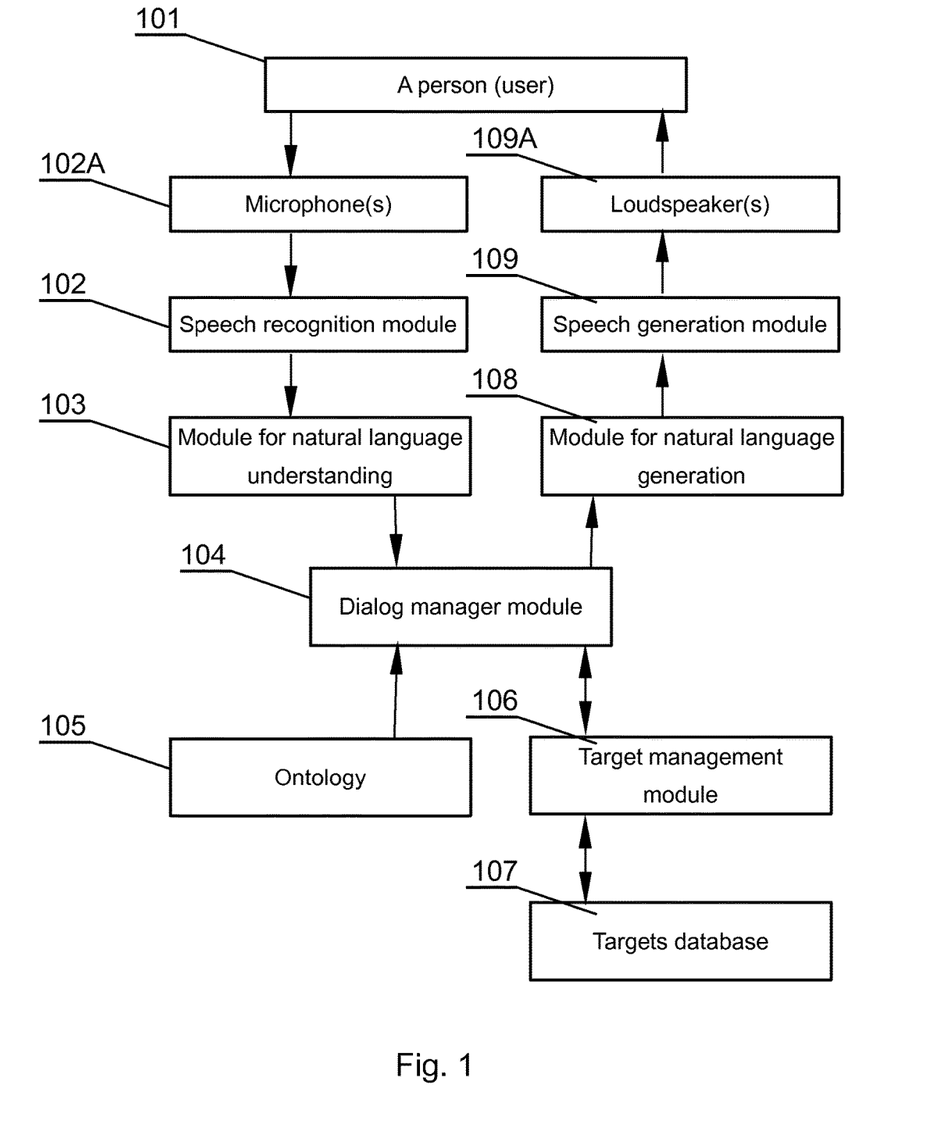
FIG. 1 presents a block diagram of a system according to the present invention.

FIG. 1 presents a block diagram of a system according to the present invention. Such system may be used in interactive advertising or otherwise information providing dialog systems. The dialog shall be as close to a real conversation as possible. Implementation of such assumption is possible due to use of techniques such as pattern recognition, semantic analysis, use of ontology knowledge and natural language generation followed by speech synthesis.

Dialog systems, in which the present invention may be used, may comprise high quality displays or image projectors. In preferred embodiments the dialog systems may also be equipped with user presence detection or, in more advanced cases, user characteristics detectors such as biometric detectors, face recognition modules and the like. The dialog system may also comprise directional microphones for more efficient acquisition of speech.

Output information is adjusted to the context of the dialog and determined user preferences. The dialog system preferably also outputs visual avatar or a person' image with which the user talks.

The dialog system employing speech recognition communicates interactively with a person or a plurality of persons 101. A person 101 inputs questions by speaking to a sound input module, for example to a microphone 102A. The sound registered by the microphone is processed by a speech recognition module 102 and is subsequently delivered to a module for recognizing natural language 103.

The module for understanding 103 is responsible for interpreting hypotheses of recognitions of statements of a person 101 in a context of anticipated responses in such a manner so that they are understandable for a machine and may be easily and quickly processed. For example, if the system has been implemented at a tourist information spot, the module for understanding 103 based on a list of speech hypotheses with their probabilities has a task of determining whether the speaker seeks a specific place, if he does then what place is it, or a service, information on time, at which public transport operates etc. In a simplest version the module utilizes for this purpose keywords, but here there may be also used a more advanced solution, based on syntax models (e.g. sentence parsers) and/or semantic (e.g. Wordnet or semantic HMM) presented in D. Jurafsky, J. H. Martin, "Speech and Language Processing", Second Edition, Pearson Education, Prentice Hall, 2009.

After being processed in the module for understanding of natural language 103, sentences or hypotheses of sentences are passed to a dialog manager module 104 (e.g. such as described in D. Jurafsky, J. H. Martin, "Speech and Language Processing", Second Edition, Pearson Education, Prentice Hall, 2009), which in cooperation with target manager module 106 and targets database 107, by appropriately querying an ontology module 105, determines a response to be presented to a user query.

The ontology module 105 comprises an ordered knowledge about the universe, for example information on which products are available in certain kinds, what people have bought together with selected one etc. The ontology module may comprise additionally different kinds of data from social services, for example to check whether a friend of the person, with whom the dialog is ongoing, is in the city, which the person visits etc. The ontology module may comprise also any other pragmatic knowledge, systematized in such a manner so that a computer or other machine could process it.

The target manager module 106 is used to implement, in a computer, known rules of commerce, advertising, negotiations etc., which would direct a specialist person (e.g. commercial employee), whose duties are carried out by the system according to the invention.

After determining the content of a response, a response in natural language is generated at the module for generating natural language 108 and subsequently in the speech generation module 109. The generated response, in form of speech, is output to the person 101 via a loudspeaker or other output device 109A installed in the system.

A key element used in the present invention is a computer-implemented module for analysis made of Bayesian networks. Bayesian networks enable modeling of complicated phenomena, in which separate elements may depend on each other. A basic model is created as a directional, acyclic graph, in which nodes represent separate elements of the model (random variables), whereas edges represent dependencies between these elements.

Additionally, the edges have assigned probability values specifying that one of the events occurs under a condition that another event assumes a particular value. By using Bayes theorem, complex conditional probabilities may be calculated for a particular path of the Bayesian network. These probabilities may be used to infer about values which will be taken by individual elements of the network.

Each network variable has to be conditionally independent on other variables not connected with it. A graph created in this manner may be interpreted as a compact representation of events, a cumulative probabilities of occurrence of these events as well as assumptions regarding conditional independence between graph's nodes.

DBNs may be employed for speech recognition. Then, the nodes represent not a single random variable but a sequence of variables. These are interpreted as time series, which allow for speech modeling according to time lapse. Therefore, a plurality of successive observations states give justification to an unambiguous path to a final state.

The use of standard Bayesian networks is based on anticipating duration of a sound, depend on a vector of articulatory features. The network has a single discrete variable for each feature and a single continuous variable for duration of a sound. The network describes relations between the features. The values of nodes representing features depend on values entered into the network and optionally on other features. A value of a node representing time duration is a hidden layer (as in the HMM), dependent directly only on values received from other nodes.

Introduction of DBNs allows for replacement of a variable representing duration with a variable representing a sound. The entire network with relations between features is copied in such a way that one of the networks represents a signal analyzed at time t−1 and the next one at time t. Both networks are connected at edges, which have probability values of transition between states that may change in time.

It is to be noted that the invention is not limited only to a case with two subnetworks. There may be more subnetworks, each subnetwork for a subsequent time moment. Typically, there may be hundreds or thousands of networks. Such a structure may be copied many times to subsequent time moments. Additionally, such local Bayesian network structure may modify itself between distinct times in some cases.

DBN models may also be used to join information about signals originating from different sources, for example acoustic features and visual features (such as lips movement). Systems of this kind are especially useful in applications for places with difficult acoustic conditions. Low value of Signal to Noise Ratio (SNR) makes that the use of information originating from only acoustic path, in locations such as a street, an airport, a factory etc., significantly decreases the quality of obtained results. Adding information obtained from another signal type, which is not sensitive to the same type of noise, removes the arising difficulties and allows for using speech recognition systems also in such places.

The inventors have noticed that Bayesian networks pose fewer limitations in comparison to HMM methods when used for speech analysis.

Figure 2:
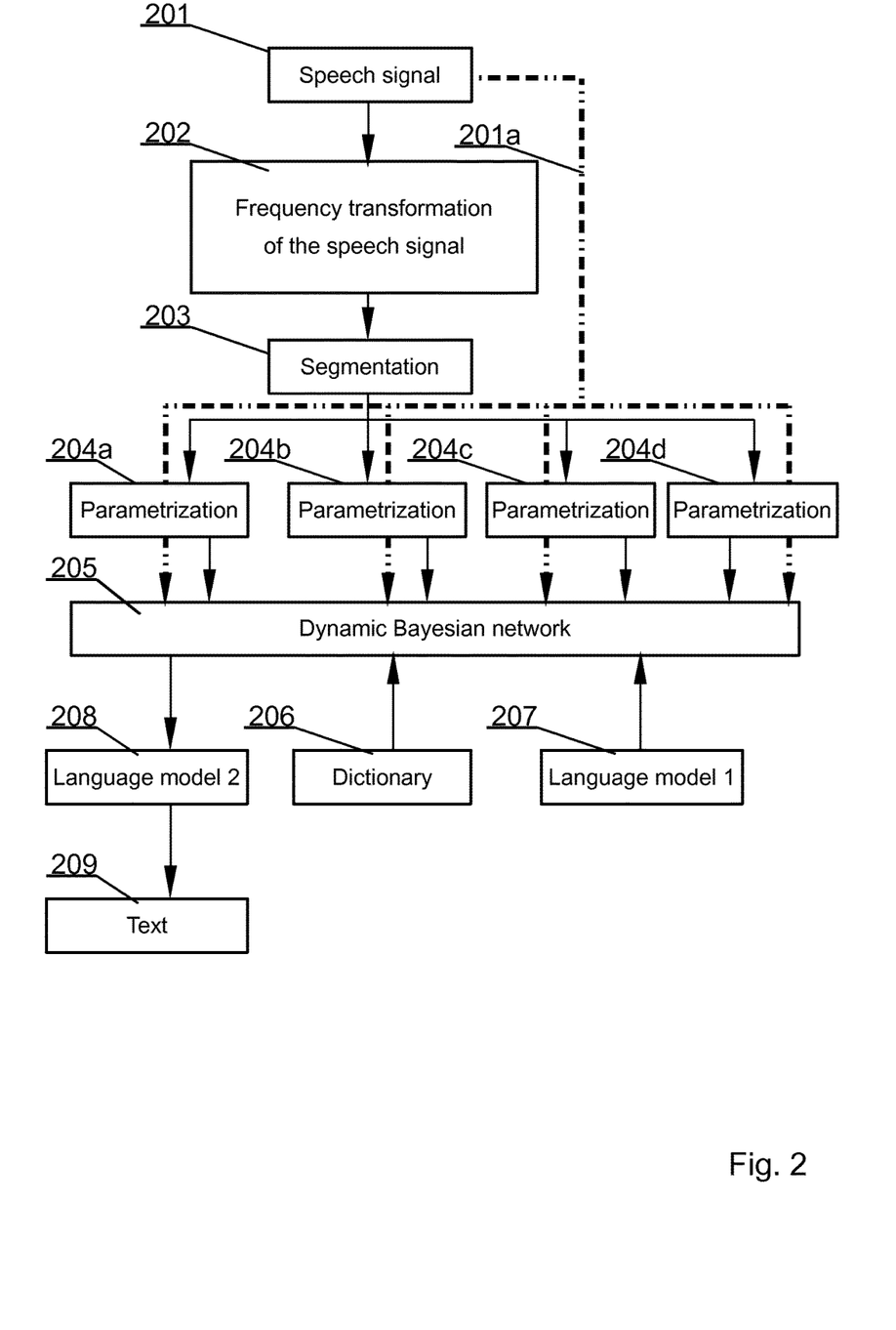
FIG. 2 presents a block diagram of the automatic speech recognition process.

FIG. 2 presents a block diagram of a speech recognition process. The following description will also reference some features of FIG. 3 that shows modeling of speech with the usage of DBNs on time related periods of different lengths.

Figure 3:
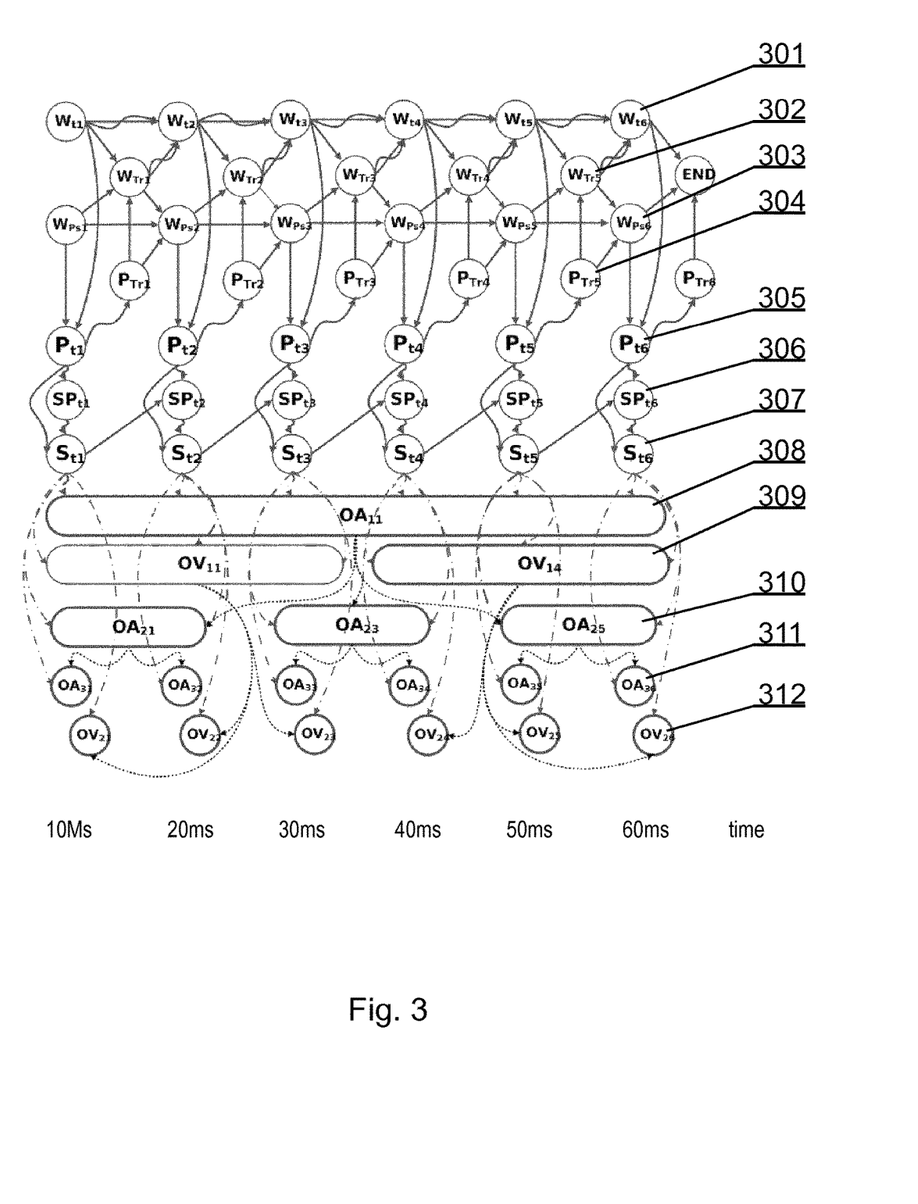
FIG. 3 shows modeling of speech with DBNs on parallel time periods of different lengths.

DBNs are used herein for modeling speech in such a way that separate observations represent different time durations—as shown in FIG. 3. These different time durations may be segments of predefined lengths, e.g. 5 ms, 20 ms, 60 ms, dependent on content of speech segments such as phonemes, syllables, words, or combinations of both types, e.g. 5 ms, 20 ms, phonemes, words.

The presented method allows for extraction of different information types and straightforward fusion of acquired features due to use of a DBN model for evaluation of states probability (St1 to St6 in FIG. 3).

Inferring in DBN is based on two kinds of relations between variables describing a model: deterministic relations (marked in FIG. 3 as straight arrows) and probabilistic relations (marked in FIG. 3 as wave-shaped arrows).

Deterministic relations are defined on the basis of known facts, e.g. when analyzing a given word Wti there is known the position Wps and the kind of the first phoneme Pti. Then, by knowing that there has occurred or has not occurred a transition Ptr from the phoneme to the next one, there may be determined a position of the current phoneme in a word: Wps at time t+1 is equal Wps at time t if the transition of phoneme has not been present or is equal to Wps+1 in case the aforementioned transition has been observed.

Information regarding transition Wtr from one word to another can be obtained in a similar manner. The occurrence of a transition from the last phoneme of a transcribed word implies a necessity of analysis of another word Wti.

Another type of relations are probabilistic relations. In order to infer on the basis of variables, between which there exists a probabilistic relation, it is necessary to determine the function defining probability of occurrence of these events (a probability density function—PDF). A relation of this kind is used for linking observed features of a signal with a current state Sti. The preferred PDF functions are Gaussian Mixture Models—GMM.

Some of the relations may be both deterministic and probabilistic, such as consecutive words Wti. In case a transition from one word to another has not occurred, the relation is deterministic—the word is the same as at the time t−1. In case a transition has occurred, then the next word Wti+1 is determined in a probabilistic manner with a use of knowledge from a language model.

Inferring in DBN is effected on the basis of observations of acoustic features. However, any observations may be subject to measurement error(s). Introduction of probabilistic relations between related, time-variable observations belonging to the same group (for example OA11, OA23 and OA33 or OV11 and OV23 in FIG. 3) allows to reduce such errors.

The state Sti and the previous state Sti−1 are used for evaluating probability that the observations are results of speaking a given phoneme (Pt1 to Pt6 in FIG. 3).

The occurrence of a given phoneme also relates probabilistically to a transitory state Ptr. The phoneme Pti, phoneme transition Ptr, position of the phoneme in the word Wps and a transition from the word Wtr allow for evaluating correctness of a hypothesis that the recorded sound contains word W.

The speech has the characteristic that certain frequency features as well as energy features are almost constant in short time periods. However, in long time periods they vary significantly. Nevertheless, the particular moment when the first and the second situations occur are not defined, hence use of DBN model is very advantageous. Relations between observations in different segments may, but do not have to, be present.

For example for a variant of a configuration with four time periods they may assume 5 ms, 20 ms, phonemes and words for parallel analysis. There are possible different model configurations, for example where there are relations between all four ranges but also where there are relations only between the layer of 5 ms and 20 ms and the layer of phonemes, where there are relations only between the layer of 20 ms and the layer of phonemes or where there are relations only between the layer of phonemes and the layer of words.

Additionally, each of the ranges may have several observation types related to different kinds of features of speech. For example, one of them may be a frequency features vector, another one may be energy and yet another one may be a visual features vector. These may be also acoustic features of the same kind but obtained with different methods (for example WFT (Wavelet-Fourier Transform), MFCC (Mel-Frequency Cepstral Coefficients)) and also acoustic features obtained with the same methods but for different time ranges, for example for a moving window of 20 ms, for a moving window of 50 ms, both extracted every 10 ms.

Moreover, some ranges may occur only in analysis of a particular kind of features and not be available in other kind (FIG. 3—observations of acoustic features 1 (308) last for 60 ms, observations of acoustic features 2 (310) last for ms and observations of visual features 1 (309) last for 30 ms).

There may be more type of features describing the signal used during the analysis, also simultaneously, for example the pitch frequency, formant frequencies, or voiced/unvoiced description of the sound.

The method presented in FIG. 2 starts at step 201 with an acquisition of a speech signal. The next step 202 is to process the signal to frequency domain by means of e.g. WFT or a time-frequency transform using Short-Time Fourier Transform (STFT). It is possible to apply other transforms allowing for quantitative description of information (like signal energy) comprised in different frequency sub-bands at different time moments.

Subsequently, at step 203, the time-frequency spectrum is divided into constant frames, for example 5 ms, 20 ms, 60 ms etc. or segmented according to predefined algorithms, such as presented for example in:

P. Cardinal, G. Boulianne, and M. Comeau, "Segmentation of recordings based on partial transcriptions", Proceedings of Interspeech, pp. 3345-3348, 2005; or K. Demuynck and T. Laureys, "A comparison of different approaches to automatic speech segmentation", Proceedings of the 5th International Conference on Text, Speech and Dialogue, pp. 277-284, 2002; or Subramanya, J. Bilmes, and C. P. Chen, "Focused word segmentation for ASR", Proceedings of Interspeech 2005, pp. 393-396, 2005.

The segmentation module (203) divides the process of spectrum analysis into multiple lines, which will be parameterized independently.

The number of lines may be different than four as previously described. The example on FIG. 2 employs four separate lines with frames of 5 ms—204a, 20 ms—204b, phoneme—204c and word—204d, whereas from each of the lines features are extracted in blocks 204a to 204d, representing speech at a particular time. These parameterization blocks may employ processing algorithms such as MFCC, Perceptual Linear Prediction (PLP), or other such as:

H. Misra, S. Ikbal, H. Bourlard, and H. Hermansky, "Spectral entropy based feature for robust ASR", Proceedings of ICASSP, pp. I-193-196, 2004; and/or L. Deng, J. Wu, J. Droppo, and A. Acero, "Analysis and comparison of two speech feature extraction/compensation algorithms", IEEE Signal Processing Letters, vol. 12, no. 6, pp. 477-480, 2005; and/or D. Zhu and K. K. Paliwal, "Product of power spectrum and group delay function for speech recognition", Proceedings of ICASSP, pp. I-125-128, 2004.

The features obtained from modules 204a to 204d are passed together with observations 201a, such as a signal energy and a visual features vector, to DBN 205. The DBN model, using its embedded algorithms of approximate inferring for the BN, for example Variational Message Passing, Expectation Propagation and/or Gibbs Sampling, with the use of Dynamic Programming algorithms used in speech recognition, such as Viterbi decoding and/or Baum-Welch, and based on content of the dictionary 206 and the language model 207, for example bigrams of words, determines words hypotheses and calculates their probabilities. In most cases the hypotheses will partially overlap, because the DBN may present different hypotheses for the same time period. The hypotheses may be subsequently processed in a further language model 208 (preferably, more advanced than the first language model used in the DBN), in order to obtain the recognized speech text 209.

FIG. 3 presents an exemplary DBN structure. Items W 301 denote words, Wtr 302 denote a word transition, Wps 303 denote the position of a phoneme in a particular word, Ptr 304 denote a phoneme transition, Pt 305 denote a phoneme, Spt 306 denote a preceding state, S 307 denote a state, OA1 308 denote observed acoustic features of a first kind in a time window of 60 ms, OV1 309 denote observed visual features of a first kind in a time window of 30 ms, OA2 310 denote observed acoustic features of a second kind in a time window of 20 ms, OA3 311 denote observed acoustic features of a third kind in a time window of 10 ms, while OV2 312 denote observed visual features of a second kind in a time window of 10 ms.

The arrows represent relations (dependencies) between variables, as previously described. The transitions are defined by conditional probability distributions (CPDs), which are calculated during the training process of Bayesian network, based on training data.

Figure 4:
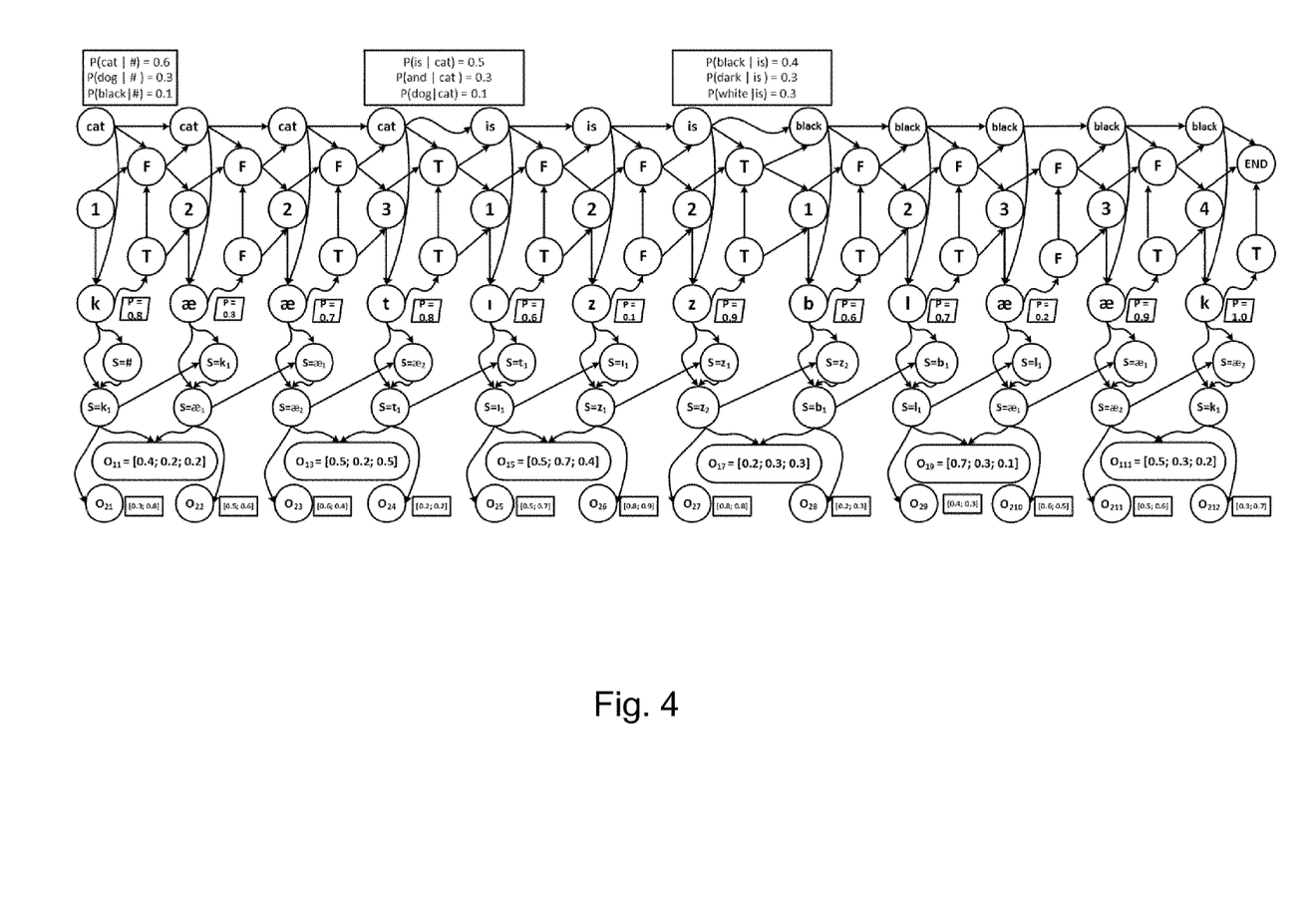
FIG. 4 depicts an example of use of DBN similar to the one shown in FIG. 3 for decoding of sequences of words (a version that has been simplified for exemplary purposes).

FIG. 4 depicts an example of use of the DBN shown in FIG. 3, for decoding word sequences. If differs from FIG. 3 in that for speech recognition there has been used one kind of acoustic features of a signal, for two frames of different length. The network presents a process of decoding of the phrase: 'Cat is black'—phonetic transcription: /kæt ɪz blæk/. The phoneme state depends on two kinds of observations O1 and O2. The previous state 306 at the time t is an exact copy of state 307 at the time t−1. The analysis is applied to subsequent phonemes of the word 301 depending on the current position in the word 303, occurrences of phoneme transitions to another one 304, the state 306 and the preceding state 307 of the phoneme. The phoneme transition occurs if the value of transition probability is greater than 0.5. The symbols of separate nodes of the Bayesian network from FIG. 3 have been replaced with values of these states. For 302 and 304 they are values: T (True)/F (False) denoting occurrence or lack of occurrence of a transition between subsequent words or subsequent phonemes, respectively. For the position of a phoneme in a word 303 it is an index of the currently analyzed phoneme (1-3 for the word 'cat', 1-2 for the word 'is', 1-4 for the word 'black'). A change of phoneme index occurs only when in the preceding moment of time t−1 a transition of phoneme 304 obtained a value of "T". In addition, the word 301 changes only at the place of occurrence of word transition 302, which is obtained at the moment of phoneme transition 304 from the last index in a particular word. The relation between subsequent words changes in such case from deterministic to probabilistic as a result of using a language model. The exemplary values of bigrams language model (a model utilizing couples of words) are shown in a table above a drawing. Additionally, there have been presented exemplary values of initial word probability in the language model. The technical effect achieved by the simultaneously processing of segments with various time durations and several kinds of features is an increase in speech recognition quality, because one type of phonemes, spoken in various manners, are recognized better at one type of time segments and other requires different type of segments, but determining an appropriate analysis time window for each phoneme kind is complex. Additionally, some features present stationary properties, allowing for precise extraction of information at more local time segment, while other require more global time segment. Using the structure as shown in FIG. 3 there may be extracted both kinds of features at once. In traditional systems there are used pieces of information carried only by local features or only by global features. Additionally, for example visual features may have different duration than acoustic ones i.e. for example observation of lips set to speak a sound may last longer or shorter than a particular sound.

It can be easily recognized, by one skilled in the art, that the aforementioned speech recognition method may be performed and/or controlled by one or more computer programs. Such computer programs are typically executed by utilizing the computing resources in a computing device such as personal computers, personal digital assistants, cellular telephones, receivers and decoders of digital television, information kiosks or the like. Applications are stored in non-volatile memory, for example a flash memory or volatile memory, for example RAM and are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the claims that follow.

The invention claimed is:

1. A computer-implemented method for speech recognition, comprising the steps of:
   registering, by means of an input device, an electrical signal representing speech and converting said signal to frequency or time-frequency domain to obtain a converted signal,
   analyzing said converted signal in an analysis module based on Dynamic Bayesian Network, configured to generate hypotheses of words (W) and their probabilities on the basis of observed acoustic (OA) signal features or acoustic (OA) and visual (OV) signal features,
   recognizing, on the basis of certain word (W) hypotheses and their probabilities, a text corresponding to said electrical signal representing speech,
   and further comprising: during the recognition process, inputting to said analysis module said observed acoustic (OA) signal features or acoustic (OA) and visual (OV) signal features which are determined for said converted signal in frequency or time-frequency domain in at least two parallel signal processing lines, wherein at least two of said signal processing lines are configured to determine the acoustic (OA) signal features and at least one of said signal processing lines configured to determine the acoustic (OA) signal features is configured to receive said converted signal segmented in a different manner than at least one other signal processing lines configured to determine the acoustic (OA) signal features such that at least some frames of at least one line of said signal processing lines configured to determine the acoustic (OA) signal features can be shared between different states of said Dynamic Bayesian Network than the frames of at least one other signal processing line configured to determine the acoustic (OA) signal features,
   and analyzing, in said analysis module, relations between said observed signal features for at least two distinct time segments.

2. The method according to claim 1, wherein said time segments have a predefined duration.

3. The method according to claim 1, wherein said time segments depend on the content of said speech segments.

4. The method according to claim 3, wherein the content of said speech segments comprises phonemes, syllables and/or words.

5. The method according to claim 1, further comprising defining, in said analysis module, deterministic and probabilistic relations between variables describing the model, whereas the probabilistic relations are defined at least for linking said observed signal features with a current state (Sti).

6. The method according claim 1, further comprising analyzing different observed signal features (OA, OV) simultaneously.

7. A computer-implemented system for speech recognition, said system comprising:
   an input device for registering an electrical signal representing speech,
   a converting module for converting said registered electrical signal representing speech to a converted signal in a frequency or time-frequency domain,
   an analysis module based on a dynamic Bayesian network, configured to analyze said converted signal and to generate hypotheses of words (W) and their probabilities on the basis of observed acoustic (OA) signal features or acoustic (OA) and visual (OV) signal features,
   a recognition module for recognition of text corresponding to said electrical signal representing speech on the basis of said generated hypotheses of words (W) and their probabilities,
   wherein the system further comprises:
   at least two signal parameterization modules for determining, during the recognition process, for said analysis module at least two observed acoustic (OA) signal features or acoustic (OA) and visual (OV) signal features in at least two parallel signal processing lines, wherein at least two of said signal processing lines are configured to determine the acoustic (OA) signal features and at least one of said signal processing lines configured to determine the acoustic (OA) signal features is configured to receive said converted signal segmented in a different manner than at least one other signal processing lines configured to determine the acoustic (OA) signal features such that at least some frames of at least one of said processing lines configured to determine the acoustic (OA) signal features can be shared between different states of said Dynamic Bayesian Network the frames of at least one other signal processing line configured to determine the acoustic (OA) signal features,
   wherein said analysis module is configured to analyze dependencies between said observed signal features for at least two distinct time segments.

8. A computing device program product for speech recognition using a computing device, the computing device program product comprising:
   a non-transitory computer readable medium;

first programmatic instructions for registering, by means of an input device, an electrical signal representing speech and converting said signal to frequency or time-frequency domain to obtain a converted signal, second programmatic instructions for analyzing said converted signal in an analysis module based on Dynamic Bayesian Network, configured to generate hypotheses of words (W) and their probabilities on the basis of observed acoustic (OA) signal features or acoustic (OA) and visual (OV) signal features, third programmatic instructions for recognizing, on the basis of certain word (W) hypotheses and their probabilities, a text corresponding to said electrical signal representing speech, fourth programmatic instructions for, during the recognition process, inputting to said analysis module said observed acoustic (OA) signal features or acoustic (OA) and visual (OV) signal features which are determined for said converted signal in frequency or time-frequency domain in at least two parallel signal processing lines, wherein at least two of said signal processing lines are configured to determine the acoustic (OA) signal features and at least one of said signal processing lines configured to determine the acoustic (OA) signal features is configured to receive said converted signal segmented in a different manner than at least one other signal processing lines configured to determine the acoustic (OA) signal features such that at least some frames of at least one line of said signal processing lines configured to determine the acoustic (OA) signal features can be shared between different states of said Dynamic Bayesian Network than the frames of at least one other signal processing line configured to determine the acoustic (OA)signal features, fifth programmatic instructions, for analyzing, in said analysis module, relations between said observed signal features for at least two distinct time segments.

* * * * *